Figure 1:
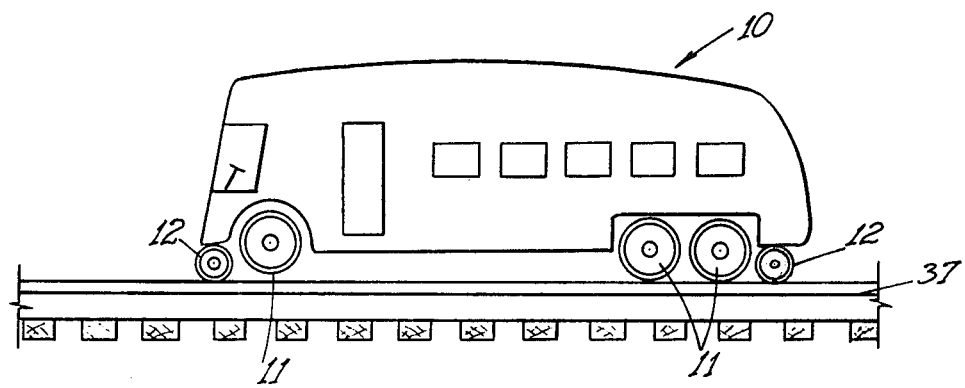

United States Patent

Yard

[15] 3,638,581
[45] Feb. 1, 1972

[54] CONVERTIBLE RAIL-HIGHWAY VEHICLE TILT CONTROL

[72] Inventor: William James Yard, Cavan, Australia

[73] Assignee: Aresco Trak-Chief Proprietary Limited, Cavan, Australia

[22] Filed: Mar. 4, 1970

[21] Appl. No.: 16,369

[30] Foreign Application Priority Data

Mar. 4, 1969 Australia ..........................51,408/69

[52] U.S. Cl.........................105/215 C, 105/174, 105/224 R
[51] Int. Cl....................B61d 15/00, B61f 9/00, B62d 61/12
[58] Field of Search......................105/49, 174, 215 C, 224 R

[56] References Cited

UNITED STATES PATENTS 1,829,464   10/1931   Wheeler ................................105/174
2,110,230   3/1938    Main...................................105/215 C
1,272,118   6/1918    Rushton.................................105/174
3,263,628   8/1966    Grove et al..........................105/215 C
3,479,968   11/1969   Crompton............................105/49 X
2,934,027   4/1960    Applegate..........................105/174 X
3,115,100   12/1963   Janeway ...............................105/174

*Primary Examiner*—Arthur L. La Point
*Assistant Examiner*—Howard Beltran
*Attorney*—Oldham & Oldham

[57] ABSTRACT

Tilt control means for a rail vehicle effective in making the vehicle chassis tilt upwardly in the direction of displacement while negotiating a curve so that the vehicle leans into the curve, by utilizing pivoted control arms between the chassis and the vehicle wheels, the control arms diverging downwardly.

10 Claims, 4 Drawing Figures

PATENTED FEB 1 1972 3,638,581

SHEET 1 OF 2

INVENTOR
WILLIAM JAMES YARD
BY
Oldham & Oldham
ATTORNEYS

INVENTOR
WILLIAM JAMES YARD

BY

Oldham & Oldham
ATTORNEYS

CONVERTIBLE RAIL-HIGHWAY VEHICLE TILT CONTROL

This invention relates to tilt control means for tilting of the chassis relative to the wheels of a road-rail or other rail vehicle when a central force is applied to the chasses.

When a convertible rail-highway vehicle runs along the rails a difficulty is encountered in the tendency for the vehicle to tilt outwardly towards the convex side of a curve as it negotiates a curve. This tilting shifts the center of gravity of the vehicle outwardly and results in high rail wear and in extreme cases, derailment. One of the main objects of this invention is to provide improvements which will automatically counter such tilting.

This invention may be said to consist of tilt control means for a rail vehicle which has a chassis and rail-engaging wheels carried on an axle journaled in bearings, comprising a subframe, means coupling the subframe to the chassis, and means coupling the subframe to the wheel axle bearings, one of said means comprising at least one pair of spaced symmetrical tilt control arms having pivot means at their respective ends, the axes of the pivot means all being parallel to the direction of travel of the vehicle, the tilt control arms diverging downwardly so that upon sideways displacement the chassis tilts upwardly in the direction of displacement.

Thus if the sloping tilt control arms of the or each pair which diverge downwardly couple a retractable frame at their upper ends to a subframe at their lower ends, the subframe being supported by the rail-engaging wheels of the vehicle, when the vehicle is viewed from the front and tends to move, say to the right (due to central force), then the right-hand tilt control arm will move upwardly and the left-hand downwardly, so that the vehicle will tilt in the correct direction. This will result in movement of the center of gravity of the vehicle shifting slightly to the left, so that normal principles of precession will apply.

Where convertible rail-highway vehicles are to be used for heavy duty purposes, it becomes essential to have a substantial front wheel assembly, wherein the rail-engaging wheels can move relative to a main chassis, and this invention may include as a further feature a vehicle having a chassis frame extension with forwardly projecting hinged arms forming portion of a retractable frame coupled to the extension by means of hydraulic cylinders, the retractable frame having a subframe carried thereon for limited movement relative thereto, and a sprung frame carried by the subframe and having suspension springs operatively disposed therebetween. With this arrangement it becomes possible with a physically strong and rigid set of frames to have each frame movable relative to the other, and the suspension springs applying loading separately to the rail-engaging wheels carried on the ends of the sprung frame. Thus deviations which exist in the rail track will be considerably smoothed out by such a suspension, while at the same time the danger of derailment is substantially reduced.

Figure 4:
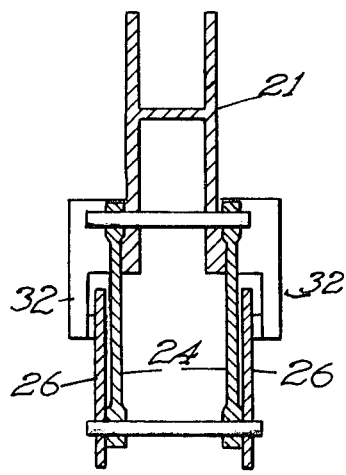
Figure 2:
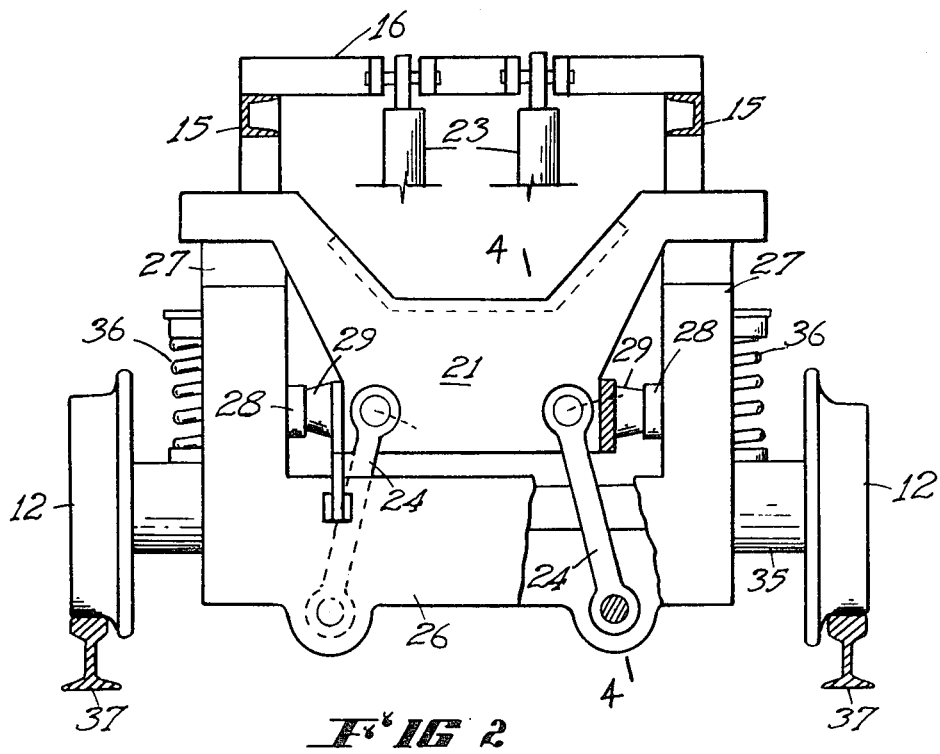
Figure 3:
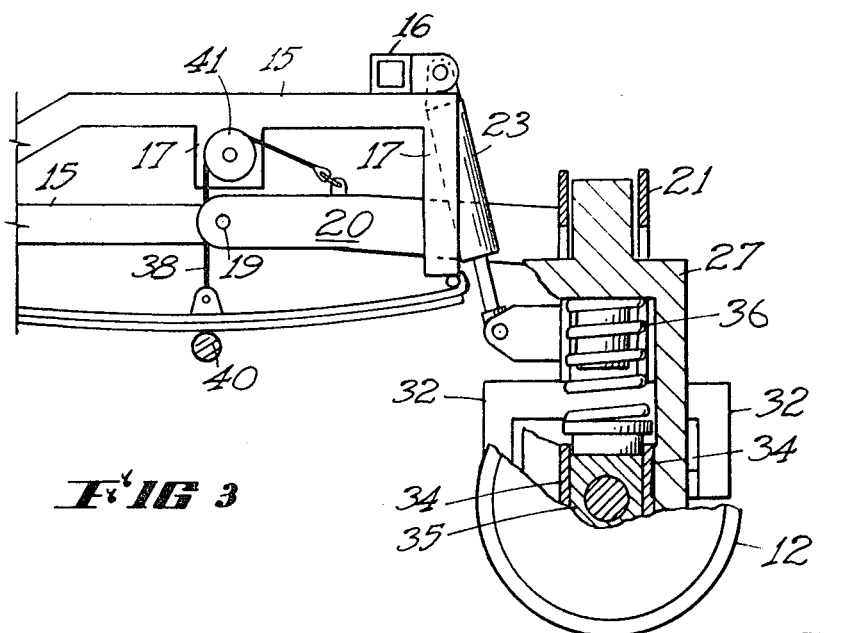

An embodiment of the invention is described hereunder in some detail with reference to and is illustrated in the accompanying drawings, in which FIG. 1 is a diagrammatic view of a convertible rail-highway vehicle travelling on rails, FIG. 2 is a front enlarged view showing the tilt control means, FIG. 3 is a partly sectioned side elevation which shows the wheel axle bearings, and FIG. 4 is a fragmentary section taken on line 4—4 of FIG. 2.

According to this embodiment a road-rail vehicle 10 is provided with highway wheels 11 having pneumatic tires in the normal way, but is also provided both fore and aft with rail-engaging wheels 12 carried on respective frames. This embodiment is described in detail with reference to the forward rail-engaging wheels.

The front end of the chassis 15 of the vehicle 10 is provided with a chassis frame extension 16 which has longitudinal members disposed above the chassis and secured thereto by short posts 17 or frame members. The chassis 15 is also provided near its front end with pivot-mounting means 19 to which the rear ends of forwardly projecting arms 20 are pivotally secured, the forwardly projecting arms 20 terminating at their front ends in a transverse member which forms therewith a retractable frame 21. The retractable frame 21 is further coupled to the chassis frame extension 16 by a pair of lift and retraction cylinders 23, and when these are extended the rail-engaging wheels 12 are urged downwardly thereby lifting the front pneumatic tires 11 from engagement with the rails.

The retractable frame 21 is supported by a pair of tilt control arms pivoted thereto, the tilt control arms diverging downwardly and being in compression. The lower ends of the tilt control arms are pivoted to a subframe 26, and the subframe has a pair of upstanding side members 27 containing cup-shaped sockets 28 and these cup-shaped sockets are engaged by rubber buffers 29 carried on a retractable frame, so that side movement of the retractable frame is restrained by the rubber buffers. The retractable frame 21 is also provided with depending subframe retaining arms 32 which embrace the fore and aft faces of the subframe 26.

The side members 27 of the subframe 26 are provided with slipper guides 34, and a rectangular section sprung frame 35 is vertically movable between these slipper guides. The sprung frame is coupled to the subframe through a pair of compression springs 36 one at each end so that the springs separately urge the rail-engaging wheels 12 into engagement with the rails 37 when the retractable frame is lowered.

In order to limit the downward movement of the retractable frame, a heavy cable 38 (FIG. 3) couples the retractable frame 21 to the front axle 40 of the vehicle 10 carrying the pneumatic tire wheels 11 on its ends, the cable passing over a pulley 41 journaled onto the chassis frame extension.

A brief consideration of the above embodiment will indicate that the invention is very simple but nevertheless provides means which correct any tendency for the vehicle to tilt outwardly as it negotiates a curve by lowering the inner side and raising the outer side of the vehicle. Any tilt therefore is in the "correct" direction. It will be appreciated that by providing three frames which are relatively movable within limits, the variations which might occur in a permanent way track can be followed by the rail-engaging wheels without shock loading being applied to the main vehicle.

What I claim is:

1. Tilt control means for a convertible rail-highway vehicle which has a chassis and rail-engaging wheels carried on an axle journaled in bearings, comprising a subframe, means pivotally coupling the subframe to the chassis, and further means coupling the subframe to the wheel axle bearings, one of said means comprising at least one pair of transversely spaced symmetrical tilt control arms having upper and lower ends, pivot means at respective said ends, the axes of the pivot means all being parallel to the direction of travel of the vehicle, the distance between said pivot means at said lower ends exceeding the distance between said pivot means at said upper ends whereby the tilt control arms diverge downwardly so that upon sideways displacement, the chassis tilts transversely upwardly in the direction of displacement.

2. Tilt control means according to claim 1, further comprising a sprung frame containing said wheel axle bearings, said further means coupling the subframe to the wheel axle bearings comprising a pair of compression springs interposed between the subframe and the sprung frame.

3. Tilt control means according to claim 1, further comprising a sprung frame containing said wheel axle bearings, said further means coupling the subframe to the wheel axle bearings comprising a pair of compression springs interposed between the subframe and the sprung frame, a chassis frame extension securable to the chassis of the vehicle, a retractable frame, and hydraulic lifting means on the chassis frame extension coupled to the retractable frame, the pivot means at the upper ends of said tilt control arms being pivoted to the retractable frame, and the pivot means at their lower ends being pivoted to the subframe.

4. Tilt control means according to claim 3, further comprising a pair of forwardly projecting arms, further pivot means coupling the rear ends of said projecting arms to the chassis frame and securing means securing their front ends to the retractable frame.

5. Tilt control means according to claim 3, wherein the hydraulic lifting means are constituted by at least one hydraulic cylinder trunnion mounted between the retractable frame and the chassis frame extension.

6. Tilt control means according to claim 3, wherein the vehicle is provided with a front axle having pneumatic tired road wheels thereon, further comprising a cable secured at one end to the forwardly projecting arms and at the other end being securable to said front axle, and a pulley carried on the chassis frame extension, the cable passing over the pulley, the length of the cable being such that it limits downward movement of the retractable frame.

7. Tilt control means according to claim 3, wherein the subframe is provided with side members each having inwardly facing slipper guides controlling the sprung frame for relative vertical movement upon the flexure of each respective spring.

8. Tilt control means according to claim 3, wherein the retractable frame includes retaining arms which embrace the fore and aft faces of the subframe.

9. Tilt control means according to claim 3, further comprising resilient buffers positioned between the sides of the retractable frame and respective sides of the subframe, the buffers being effective in limiting sideways movement of the retractable frame with respect to the subframe.

10. Tilt control means according to claim 3, further comprising rubber buffer pads projecting outwardly from the retractable frame and engaging complementary cups on the inner faces of the side members of the subframe thereby being effective i5 limiting sideways movement of the retractable frame with respect to the side frame.

* * * * *